(12) United States Patent
Takizawa

(10) Patent No.: US 8,162,354 B2
(45) Date of Patent: Apr. 24, 2012

(54) TWISTABLE HYDRAULIC BRAKE HOSE UNIT

(75) Inventor: Shinichi Takizawa, Osaka (JP)

(73) Assignee: Shimano Inc., Osaka (JP)

( * ) Notice: Subject to any disclaimer, the term of this patent is extended or adjusted under 35 U.S.C. 154(b) by 354 days.

(21) Appl. No.: 12/179,634

(22) Filed: Jul. 25, 2008

(65) Prior Publication Data

US 2010/0019489 A1    Jan. 28, 2010

(51) Int. Cl.
*F16L 41/00*    (2006.01)
(52) U.S. Cl. .................. 285/137.11; 285/143.1
(58) Field of Classification Search ............... 285/136.1, 285/137.11, 143.1, 219, 220
See application file for complete search history.

(56) References Cited

U.S. PATENT DOCUMENTS

| | | | |
|---|---|---|---|
| 3,502,355 A * | 3/1970 | Demler, Sr. et al. | 285/110 |
| 3,874,083 A * | 4/1975 | Buckley | 433/80 |
| 5,709,413 A * | 1/1998 | Salyers | 285/219 |
| 6,283,750 B1 * | 9/2001 | Esrock | 433/80 |
| 6,319,001 B1 * | 11/2001 | Esrock | 433/80 |
| 6,527,303 B2 * | 3/2003 | Kariyama et al. | 285/249 |
| 6,688,440 B2 | 2/2004 | Matsushita et al. | |
| 7,063,357 B1 | 6/2006 | Bay | |
| 2003/0010580 A1 | 1/2003 | Nakamura | |
| 2003/0168293 A1 | 9/2003 | Kariyama | |
| 2006/0208110 A1 | 9/2006 | Guo | |

FOREIGN PATENT DOCUMENTS

| | | |
|---|---|---|
| DE | 1 932 447 U | 2/1966 |
| EP | 1 073 860 B1 | 2/2001 |
| EP | 1 083 375 A2 | 3/2001 |
| EP | 1 346 909 A1 | 9/2003 |
| FR | 1 285 677 | 2/1962 |
| GB | 1 030 697 A | 5/1966 |
| GB | 2 274 696 A | 8/1994 |

OTHER PUBLICATIONS

European Search Report of corresponding EP Application No. 09 00 9602.5 dated Aug. 2, 2010.

* cited by examiner

*Primary Examiner* — Michael P Ferguson
*Assistant Examiner* — Gwendolyn Driggers
(74) *Attorney, Agent, or Firm* — Global IP Counselors, LLP

(57) ABSTRACT

A twistable hydraulic hose joint basically has a hydraulic hose, an O-ring and a fixing bolt. The hydraulic hose includes a connectable end, a distal end, a center passageway extending between the connectable and distal ends, and an abutment part extending radially from an outer surface of the hydraulic hose adjacent the connectable end of the hydraulic hose. The O-ring is disposed on an outer surface of the hydraulic hose between an end face of the connectable end and the abutment part. The fixing bolt includes an external surface with an externally fixed portion and an internal bore. The internal bore has first and second bore sections disposed around the connectable end with the second bore section being smaller than the first bore section to form an abutment surface that faces in an axial direction of the internal bore to abut against the abutment part of the hydraulic hose.

19 Claims, 4 Drawing Sheets

TWISTABLE HYDRAULIC BRAKE HOSE UNIT

BACKGROUND OF THE INVENTION

1. Field of the Invention

This present invention generally relates to a joint (connector) for hydraulic brake hose for bicycle hydraulic brake system. More specifically, the present invention relates to a twistable hydraulic hose joint (connector) for hydraulic brake hose for a bicycle hydraulic brake lever in which the twistable hydraulic hose joint allows the hydraulic hose to twist freely with respect to the bicycle hydraulic brake lever in which the hydraulic hose joint is connected.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. In the past, the bicycle components were usually controlled by mechanically cables. However, many of the bicycle components have recently become hydraulically controlled. For example, the braking systems for many bicycles now included disc brakes.

The bicycle hydraulic brake system typically includes a hydraulic brake actuation device, a rotor attached to one of the bicycle wheels and a caliper adjacent to the rotor with brake pads that selectively contact the rotor in response to changes in hydraulic pressure in the hydraulic brake actuation device. The hydraulic brake actuation device typically has a housing mounted the bicycle handlebar. The housing includes a bore, a master piston disposed in the bore and a lever arm pivotally supported on the housing. A hydraulic hose fluidly connects the hydraulic brake actuation device to the caliper. Pivoting movement of the lever arm moves the master piston causing the hydraulic fluid to be force through the hydraulic hose to move a slave piston in the caliper. Typically, the brake pads are spaced apart from braking surfaces of the rotor until urged into braking contact with the rotor by movement of the slave piston.

The hydraulic hose typically has a hydraulic hose joint at each end so that the hydraulic hose can be replaced if it becomes damaged or worn out. Examples of some prior art hydraulic hose joints are disclosed in U.S. Pat. Nos. 6,527, 303 and 6,688,440 (both assigned to Shimano, Inc.). U.S. Pat. No. 6,527,303 discloses a hydraulic hose assembly for bicycle that has a flexible hydraulic hose, a rigid tubular inset, a connecting fastener and a tubular bushing. In this patent, the hydraulic hose is non-twistably fixed to a brake operating mechanism. Thus, during installation, the hydraulic hose can become twisted, which can result in an oil leak.

In view of the above, it will be apparent to those skilled in the art from this disclosure that there exists a need for an improved hydraulic hose joint. This invention addresses this need in the art as well as other needs, which will become apparent to those skilled in the art from this disclosure.

SUMMARY OF THE INVENTION

One object is to provide a hydraulic hose joint that allows the hydraulic hose to twist freely with respect to a bicycle component in which the hydraulic hose joint is connected.

In accordance with one aspect, a twistable hydraulic hose joint is provided that basically comprises a hydraulic hose, an O-ring and a fixing bolt. The hydraulic hose includes a connectable end, a distal end, a center passageway extending between the connectable and distal ends, and an abutment part extending radially from an outer surface of the hydraulic hose adjacent the connectable end of the hydraulic hose. The O-ring is disposed on an outer surface of the hydraulic hose between an end face of the connectable end and the abutment part. The fixing bolt includes an external surface with an externally fixed portion and an internal bore. The internal bore has a first bore section disposed around the connectable end of the hydraulic hose and a second bore section that is smaller than the first bore section to form an abutment surface that faces in an axial direction of the internal bore to abut against the abutment part of the hydraulic hose.

In accordance with another aspect, a twistable hydraulic hose joint is provided that basically comprises a sleeve, an O-ring, a tubular insert and a fixing bolt. The sleeve includes a first end, a second end, a center passageway extending between the first and second ends, with the center passageway having a first passageway section with a first diameter and a second passageway section with a second diameter that is smaller than the first diameter to form a shoulder that faces in an axial direction of the center passageway. The O-ring is disposed on an outer surface of the sleeve adjacent the second end of the sleeve. The tubular insert is disposed within the first passageway section of the center passageway of the sleeve with an annular hose receiving space formed therebetween. The fixing bolt includes an external surface with an externally threaded portion and an internal bore. The internal bore has a first bore section disposed on the first end of the sleeve and a second bore section that is smaller than the first bore section to form an abutment surface that faces in an axial direction of the internal bore to abut against the first end of the sleeve.

These and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
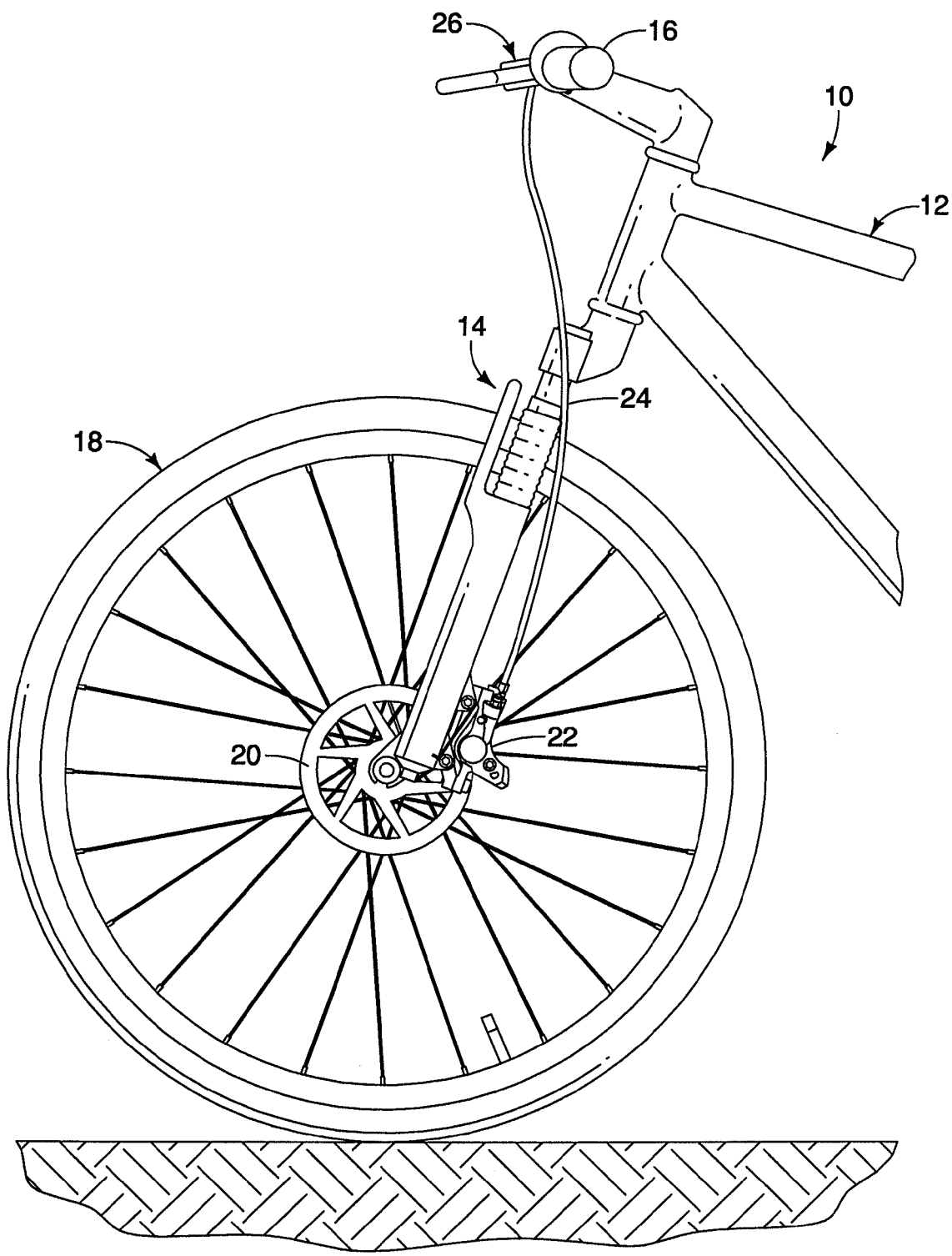
FIG. 1 is a side elevational view of a front portion of a bicycle with a front hydraulic braking system that uses a twistable hydraulic hose joint in accordance with one illustrated embodiment.

Referring initially to FIG. 1, a bicycle 10 is illustrated having a hydraulic braking system that is configured in accordance with a first embodiment. The bicycle 10 includes, among other things, a frame 12, a front fork 14, a handlebar 16 attached to the upper end of the front fork 14 to steer the bicycle 10 and a front wheel 18. The front fork 14 is pivotally supported on the frame 12. The front wheel 16 is rotatably supported on the front fork 14 in a conventional manner. The bicycle 10 and its various components are relatively conventional. Therefore, the bicycle 10 and its various components will not be discussed or illustrated in detail herein, except as they se relate to the present invention.

As shown in FIG. 1, the hydraulic braking system basically includes a rotor 20, a brake caliper 22, a flexible hydraulic hose or line 24 and a hydraulic brake actuation device 26. The rotor 20 is fixed to the front wheel 18, while the brake caliper 22 is fixed to the front fork 14 adjacent to the rotor 20 in a conventional manner. The hydraulic brake actuation device 26 is operatively (fluidly) coupled to the brake caliper 22 by the hose 24. The brake caliper 22 is a slave cylinder, while the hydraulic brake actuation device 26 is a master cylinder in the hydraulic braking system.

The description below of the hydraulic braking system is for applying a braking force to the front wheel 18. However, it should be understood that from the drawings and the description herein that the bicycle 10 includes a separate braking system configured for applying a braking force to a rear wheel (not shown). Since front and rear bicycle brake systems have the same components and operate in the same manner, only the hydraulic brake system installed for applying a braking force to the front wheel 18 is described herein for the sake of brevity. Specifically, the description herein of the hydraulic braking system applies to both front and rear braking systems.

Accordingly, the brake caliper 22 and the hydraulic brake actuation device 26 are conventional bicycle components that are hydraulically operated in a conventional manner. Since these components are conventional, they will not be discussed and/or illustrated in detail herein. Preferably, the hydraulic braking system utilizes mineral oil as the hydraulic fluid for actuating the brake caliper 22 in response to operation of the hydraulic brake actuation device 26. More specifically, when of the hydraulic brake actuation device 26 is operated, this causes the hydraulic fluid to be pressurized, and thus, causing the brake caliper 22 to apply a braking force on the disk brake rotor 20.

The flexible hose 24 is also a conventional component that is preferably constructed of a rubber tube having a metallic braided sheath. The hose 24 has an interior passageway 24a of the hydraulic hose preferably has a diameter of about 2.3 mm±0.2. The outer diameter of the hose 24 is preferably about 5.1 mm±0.2. Since the hose 24 is relatively conventional, the hose 24 will not be discussed or illustrated in detail herein.

Figure 2:
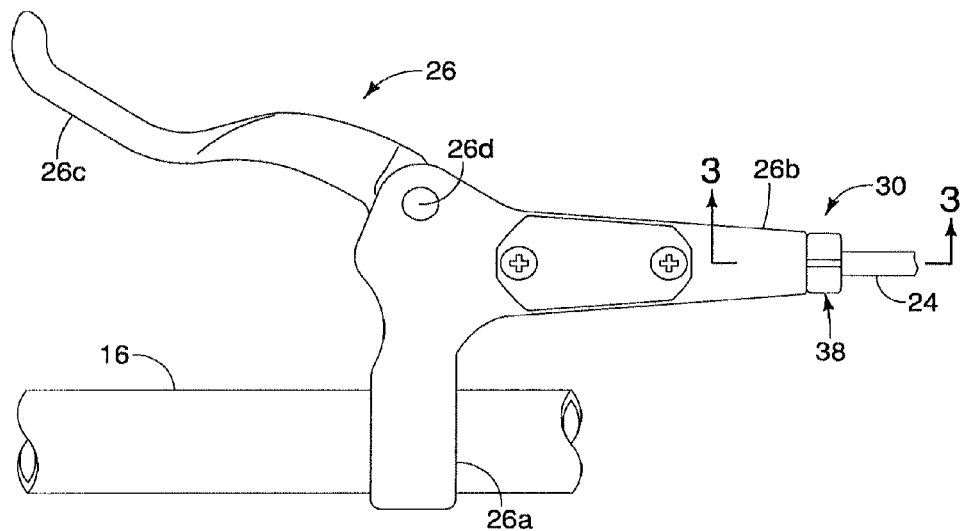
FIG. 2 is a top plan view of a front (left side) hydraulic brake actuation device that uses the twistable hydraulic hose joint in accordance with the illustrated embodiment.

As seen in FIG. 2, the hydraulic brake actuation device 26 basically has a clamping portion 26a, a main housing portion 26b and a brake lever 26c pivotally coupled to the housing portion 26b via a pivot pin 26d. The hydraulic brake actuation device 26 is supported on the handlebar 16 via the mounting portion 22b in a conventional manner. The housing portion 26b houses a master cylinder (not shown) and a piston (not shown) and a reservoir (not shown). The reservoir contains the hydraulic fluid (mineral oil) which is pressurized by movement of the piston in the master cylinder in response to the pivotal movement of the brake lever 26c towards the handlebar 16. Since the operation of the master cylinder and piston are conventional, these parts will not be discussed or shown herein.

Figure 3:
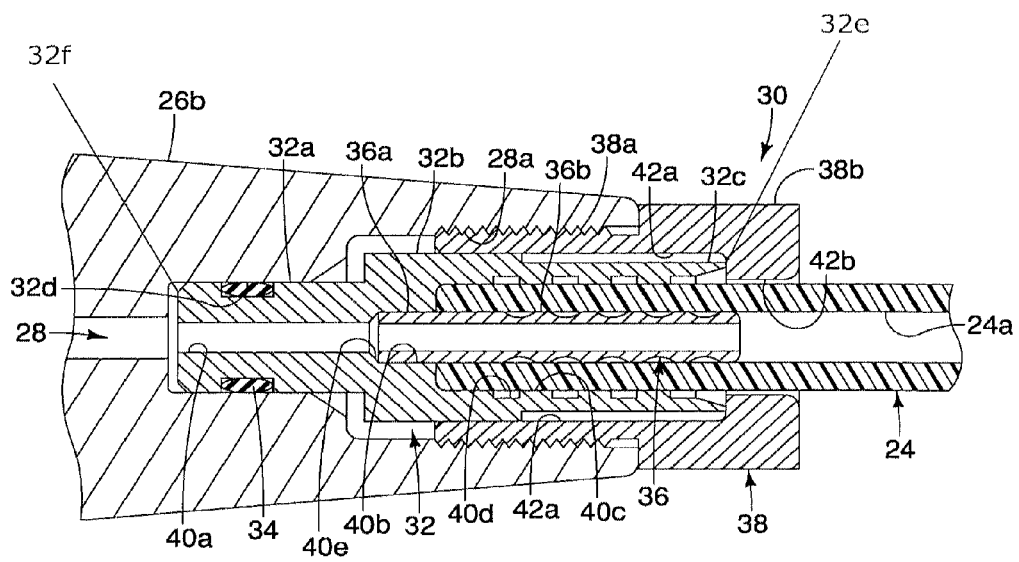
FIG. 3 is a partial cross-sectional view of the twistable hydraulic hose joint illustrated in FIG. 2 as seen along section line 3-3 in FIG. 2.
Figure 5:
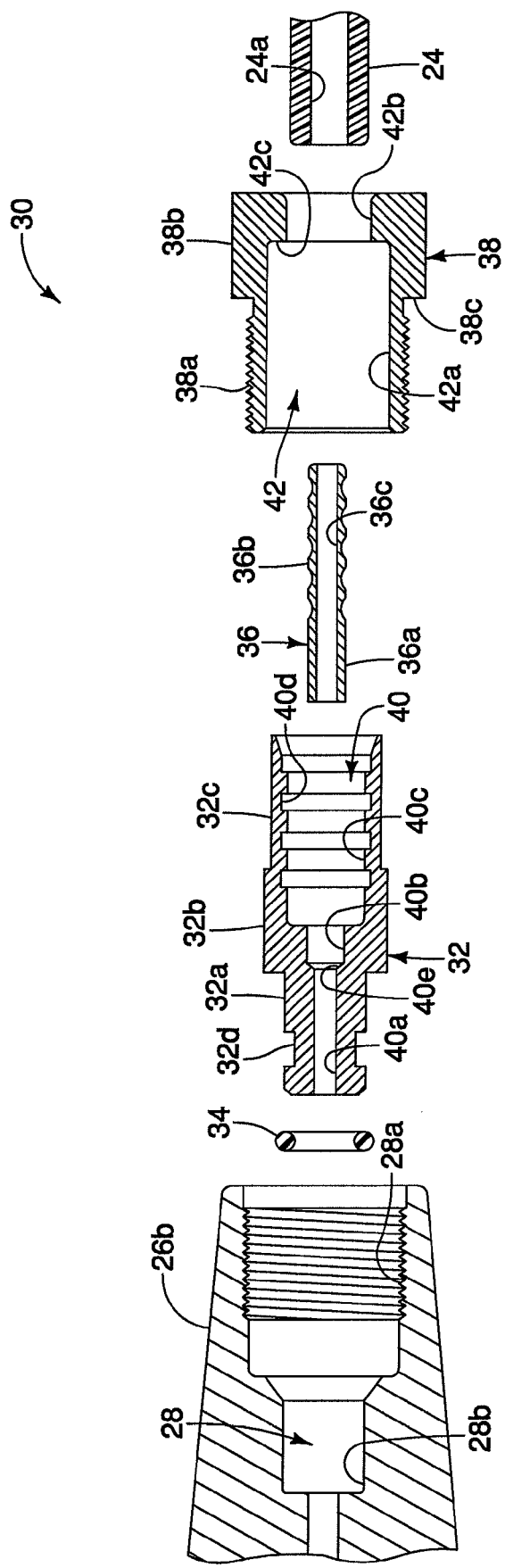
FIG. 5 is an exploded cross-sectional view of sectional view of the twistable hydraulic hose joint illustrated in FIGS. 2 to 4.

As best seen in FIGS. 3 and 5, the housing portion 26b has an internal passage 28 that is fluidly connected to the reservoir. The internal passageway 28 has a step-shaped joint receiving end with a thread section 28a and a sleeve receiving section 28b. The thread section 28a has a larger diameter than the sleeve receiving section 28b. The hydraulic hose 24 is coupled to the hydraulic brake actuation device 26 so that the hydraulic fluid (mineral oil) contained in the reservoir is fluidly connected to the interior passageway 24a of the hydraulic hose 24. In particular, as seen in FIGS. 2 and 3, preferably, one end of the hydraulic hose 24 is coupled to the hydraulic brake actuation device 26 by a twistable hydraulic hose joint 30. Of course, the other end of the can be attached to the brake caliper 22 using a twistable hydraulic hose joint that is identical to the twistable hydraulic hose joint 30, as need and/or desired. Basically, the hydraulic braking system can be any fluid operated braking system, and therefore, the parts of the hydraulic braking system will not be discussed or illustrated in detail herein, except for the twistable hydraulic hose joint 30.

Figure 4:
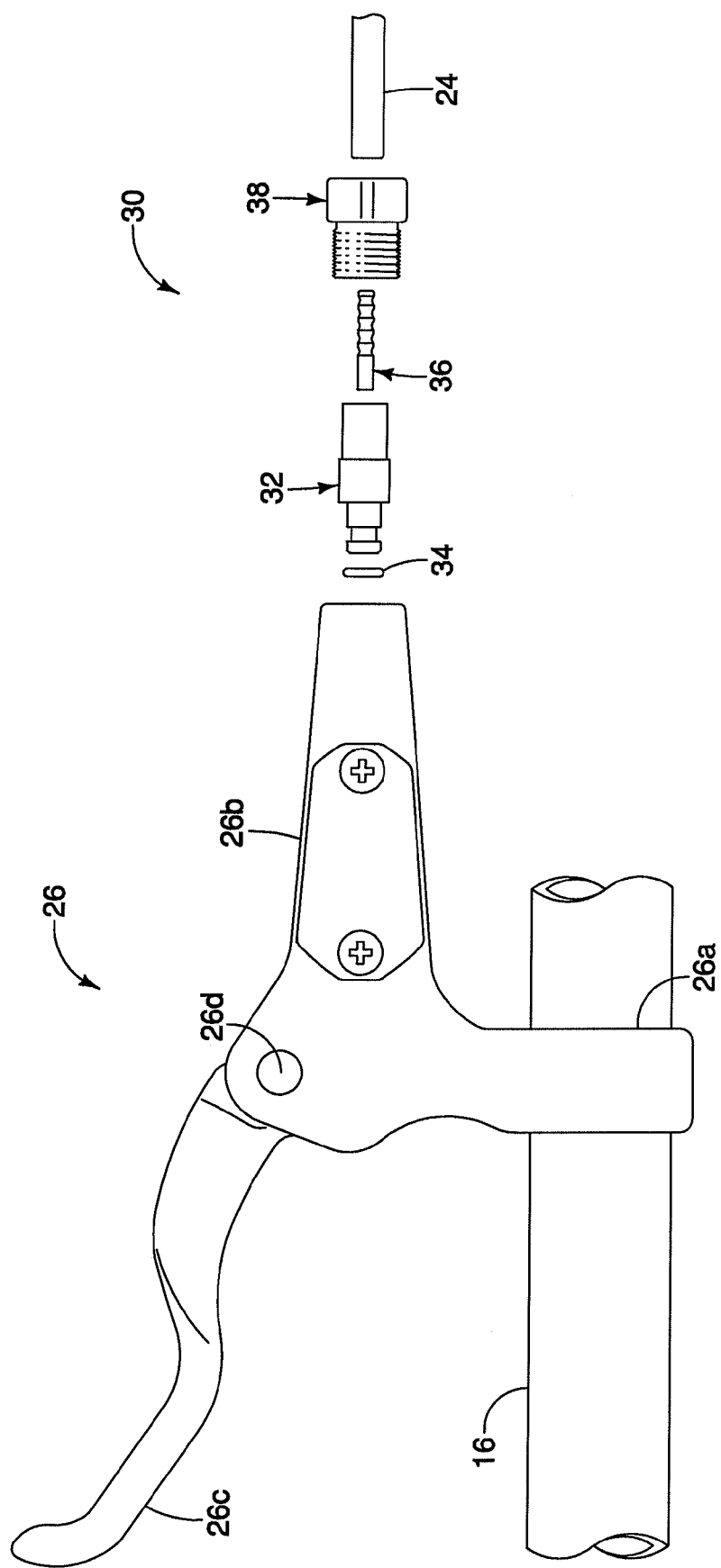
FIG. 4 is an exploded top plan view of the twistable hydraulic hose joint illustrated FIGS. 2 and 3.

In the illustrated embodiment, as best seen in FIGS. 4 and 5, the twistable hydraulic hose joint 30 basically has a sleeve 32, an O-ring 34, a tubular insert 36 and a fixing bolt 38. The twistable hydraulic hose joint 30 fixes one end of the hydraulic hose 24 to the hydraulic brake actuation device 26. The twistable hydraulic hose joint 30 is attached to the hydraulic brake actuation device 26 such that the hydraulic hose 24 can freely rotate with respect to the housing portion 26b of the hydraulic brake actuation device 26 when the hydraulic hose 24 is fully coupled to the hydraulic brake actuation device 26 such that a leak proof seal is formed therebetween. In other words, the hydraulic hose 24 is attached to the housing portion 26b of the hydraulic brake actuation device 26 to freely rotate with respect to the housing portion 26b of the hydraulic brake actuation device 26 without the hydraulic fluid leaking out of the twistable hydraulic hose joint 30.

In the illustrated embodiment, the twistable hydraulic hose joint 30 can be integrated part of the hydraulic hose 24. In other words, an end portion of the hydraulic hose 24 with the sleeve 32 attached thereto forms a connectable end of the hydraulic hose with one end of the sleeve 32 forming an abutment part extending radially from an outer surface of the hydraulic hose 24 adjacent the connectable end of the hydraulic hose 24. Also the O-ring 34 can be consider the to be disposed on an outer surface of the connectable end of the hydraulic hose 24 between an end face of the connectable end and the one end of the sleeve 32 (i.e., the abutment part of the connectable end). The fixing bolt 38 abuts against the one end of the sleeve 32 (i.e., the abutment part of the connectable end) to retain the connectable end of the hydraulic hose 24 to the hydraulic brake actuation device 26.

As seen in FIG. 5, the sleeve 32 is a one-piece, unitary member that is constructed of a rigid material such as a metallic material. The sleeve 32 is a tubular member with a center passageway 40 extending between its first and second ends. The sleeve 32 preferably includes a first sleeve section 32a, a second sleeve section 32b and a third sleeve section 32c. The sections 32a to 23c define a step-shaped outer surface. The first sleeve section 32a has an outer cylindrical surface with a first outer diameter. The second sleeve section 32b has an outer cylindrical surface with a second outer diameter that is larger than the first outer diameter of the first sleeve section 32a. The third sleeve section 32c has an outer cylindrical surface with a third outer diameter that is larger than the first outer diameter of the first sleeve section 32a, but smaller than the second outer diameter of the second sleeve section 32b. The first sleeve section 32a has an annular recess or groove 32d in which the O-ring 34 is disposed. The third sleeve section 32c has a free end that constitutes a first end 32e of the sleeve 32 that abuts the fixing bolt 38. The first sleeve section 32a has a free end that constitutes a second end 32f of the sleeve 32 that is held in the sleeve receiving section 28b of the internal passageway 28 by the fixing bolt 38 being threaded into the thread section 28a of the internal passageway 28.

The center passageway 40 of the sleeve 32 basically includes three passageway sections 40a, 40b and 40c, e.g., first, second and third passageway sections. The passageway section 40c includes a plurality of annular grooves 40d that forms a plurality of annular ribs on an inner surface of the center passageway 40. The passageway section 40a has a minimum inner diameter that is smaller than a minimum inner diameter of the passageway section 40b such that a shoulder 40e is formed that faces in an axial direction of the center passageway 40. The passageway section 40b has a minimum inner diameter that is smaller than a minimum inner diameter of the passageway section 40c. The passageway section 40b is sized to frictionally receive a first portion of the tubular insert 36 therein, with a second portion of the tubular insert 36 being disposed in the passageway section 40c so as to form an annular hose receiving space therebetween. The shoulder 40e limits the axial movement of the tubular insert 36 within the center passageway 40 of the sleeve 32. Thus, an end portion of the hose 24 is disposed on the tubular insert 36 and located in the passageway section 40c. The annular grooves 40d reduce the wall thickness of the third sleeve section 32c of the sleeve 32 so that the third sleeve section 32c can be crimped onto the end portion of the hose 24 that is disposed on the tubular insert 36 and located in the passageway section 40c. Also the annular ribs defined by the annular grooves 40d cooperate with the tubular insert 36 to prevent separation of the hose 24 from the sleeve 32 after crimping the third sleeve section 32c. In this way, the sleeve 32 and the tubular insert 36 are fixedly secured to the end portion of the hose 24.

The O-ring 34 is a one-piece, unitary member that is preferably constructed of a flexible elastomeric material with good sealing properties. The O-ring 34 is disposed in the annular groove 32d formed in the outer surface of the sleeve 32 adjacent the end of the first sleeve section 32a of the sleeve 32. The O-ring 34 seals a clearance between the internal passage 28 of the hydraulic brake actuation device 26 and the sleeve 32. Since, the sleeve receiving section 28b of the hydraulic brake actuation device 26 and the first sleeve section 32a of the sleeve 32 are both cylindrical, the sleeve 32 with the hose 24 attached thereto can rotate with respect to the hydraulic brake actuation device 26.

The tubular insert 36 is a one-piece, unitary member that is constructed of a rigid material such as a metallic material. For example, the tubular insert 36 can be formed of a copper or a copper alloy. Of course, any suitable rigid material that can carry out is function can be utilized. The tubular insert 36 has an outer surface with a non-barbed (smooth) section 36a with a constant diameter, and a barbed section 36b with a plurality of ridges or barbs. The tubular insert 36 also has an inner surface defining a longitudinal passageway 36c that passes through the non-barbed section 36a and the barbed section 36b.

The non-barbed (smooth) section 36a of the tubular insert 36 is disposed within the passageway section 40b of the center passageway 40 of the sleeve 32 and secured thereto by a press (interference) fit. The press fit fastens the sleeve 32 and the tubular insert 36 together by friction after the sleeve 32 and the tubular insert 36 are longitudinally pushed together, rather than by any other means of fastening. More preferably, the friction that holds the sleeve 32 and the tubular insert 36 together is preferably increased by compression of one part against the other, which relies on the tensile and compressive strengths of the materials that the sleeve 32 and the tubular insert 36 are made from.

The barbed section 36b of the tubular insert 36 is disposed within the passageway section 40c of the center passageway 40 of the sleeve 32 with the annular hose receiving space formed therebetween. The ridges or barbs of the outer surface of barbed section 36b are inclined such that the barbed section 36b securely engages in the interior passage 24a of the hose 24. The tubular insert 36 is designed to be retained in the end of the hose 24 to provide radial support at the end of the hose 24 when the sleeve 32 is crimped onto the hose 24.

The fixing bolt 38 is a one-piece, unitary member that is constructed of a rigid material such as a metallic material. The fixing bolt 38 has an outer surface that includes an external surface with an externally threaded portion 38a and a tool engaging portion 38b. The tool engaging portion 38b has a larger maximum width than the externally threaded portion 38a to form an external abutment 38c. In other words, the engaging portion 38b of the fixing bolt 38 has a larger external width than the externally threaded portion 38a as measured in a direction perpendicular to a center axis of the fixing bolt 38. The fixing bolt 38 is threaded into the thread section 28a of the internal passageway 28 to retain the sleeve 32 in the sleeve receiving section 28b of the internal passageway 28.

The fixing bolt 38 also includes an internal bore 42 that has a first bore section 42a, a second bore section 42b and an abutment surface 42c that connects the first and second bore sections 42a and 42b together in a radial direction. The first bore section 42a extends from a first end of the sleeve 32, while the second bore section 42b extends from a second end of the sleeve 32. The first bore section 42a has a cylindrical inner surface that is equal to or slightly larger than the outer diameter of the second sleeve section 32b so that the sleeve 32 can freely rotate with respect to the fixing bolt 38. The second bore section 42b is dimensioned to be slightly larger than the diameter of the hose 24, and is smaller than the bore section 42a to form the abutment surface 42c. The abutment surface 42c faces in an axial direction of the internal bore 42 to abut against the first end of the sleeve 32. Thus, when the fixing bolt 38 is threaded into the thread section 28a of the internal passageway 28, the abutment surface 42c contacts the first end of the sleeve 32 to retain the sleeve 32 in the internal passageway 28. Preferably, the first end of the sleeve 32 is tapered to minimize contact between the sleeve 32 and the fixing bolt 38.

One possible way of assembling the twistable hydraulic hose joint 30 to the hydraulic brake actuation device 26 will now be briefly discussed. First, the non-barbed (smooth) section 36a of the tubular insert 36 is inserted into the passageway section 40b of the center passageway 40 of the sleeve 32 and secured thereto by a press (interference) fit. Now, the fixing bolt 38 is inserted over an end portion of the hose 24 that is to be attached to the hydraulic brake actuation device 26. The the hose 24 is then inserted into the center passageway 40 of the sleeve 32 so that the barbed section 36b of the tubular insert 36 is inserted into the interior passage 24a of the hose 24. Next, the third sleeve section 32c of the sleeve 32 is crimped onto the end portion of the hose 24 that is disposed in third sleeve section 32c of the sleeve 32.

If the O-ring 34 has not already been installed in the annular groove 32d of the outer surface of the first sleeve section 32a, then the O-ring 34 is installed at this time into the annular groove 32d of first sleeve section 32a. Now, the first sleeve section 32a of the sleeve 32 is inserted into the sleeve receiving section 28b of the internal passageway 28. Finally, the fixing bolt 38 is threaded into the thread section 28a of the internal passageway 28 to retain the sleeve 32 in the sleeve receiving section 28b of the internal passageway 28.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A twistable hydraulic hose joint comprising:
a sleeve including a first end, a second end, and a center passageway extending between the first and second ends, the first end having an abutment part extending radially from an outer surface of the sleeve with respect to a center axis of the center passageway;
a tubular insert disposed inside the sleeve such that an annular hose receiving space is formed between the sleeve and the tubular insert;
a flexible tube having an end portion disposed in the annular hose receiving space between the sleeve and the tabular insert;
an O-ring disposed on the outer surface of the sleeve between an end face of the second end and the abutment part; and
a fixing bolt including an external surface with an externally threaded portion and an internal bore, the internal bore having a first bore section disposed around the sleeve and a second bore section that is smaller than the first bore section to form an abutment surface that faces in an axial direction of the internal bore to abut against the abutment part within the internal bore, with the sleeve being disposed completely on one axial side of the abutment surface of the fixing bolt with respect to a center axis of the fixing bolt,
the sleeve, the tubular insert, and the flexible tube being frictionally fixed together to twist as a unit relative to the fixing bolt.

2. The twistable hydraulic hose joint as set forth in claim 1, wherein
the center passageway of the sleeve has a first passageway section with a first diameter and a second passageway section with a second diameter that is larger than the first diameter to form a shoulder, and
the tubular insert is disposed within the second passageway section of the center passageway of the sleeve.

3. The twistable hydraulic hose joint as set forth in claim 2, wherein
the sleeve further includes a third passageway section extending from the second passageway section towards the first end of the sleeve, with the third passageway section having a larger diameter than the second diameter of the second passageway section, and
the tubular insert is disposed within the third passageway section of the center passageway of the sleeve with the flexible tube disposed in the third passageway section between the tabular insert and the sleeve.

4. The twistable hydraulic hose joint as set forth in claim 3, wherein
the third passageway section of the sleeve includes an inner surface having at least one rib.

5. The twistable hydraulic hose joint as set forth in claim 3, wherein
the third passageway section of the sleeve includes an inner surface having a plurality of annular ribs contacting the flexible tube.

6. The twistable hydraulic hose joint as set forth in claim 2, wherein
the tubular insert includes an outer surface with at least one ridge contacting the flexible tube.

7. The twistable hydraulic hose joint as set forth in claim 2, wherein
the tubular insert includes an outer surface with a plurality of ridges contacting the flexible tube.

8. The twistable hydraulic hose joint as set forth in claim 1, wherein
the outer surface of the fixing bolt further includes a tool engaging portion that has a larger external width than the externally threaded portion as measured in a direction perpendicular to the center axis of the fixing bolt.

9. The twistable hydraulic hose joint as set forth in claim 1, wherein
the sleeve is crimped onto the end portion of the flexible tube such that the sleeve frictionally engages the flexible tube.

10. The twistable hydraulic hose joint as set forth in claim 1, wherein
the tubular insert contacts an interior passageway of the end portion of the flexible tube such that the flexible tube is frictionally secured on the tubular insert.

11. A twistable hydraulic hose joint comprising:
a sleeve including a first end, a second end, a center passageway extending between the first and second ends, with the center passageway having a first passageway section with a first diameter and a second passageway section with a second diameter that is larger than the first diameter to form a shoulder;
an O-ring disposed on an outer surface of the sleeve adjacent the second end of the sleeve;
a tubular insert being disposed within the center passageway of the sleeve such that an annular hose receiving space is formed between the sleeve and the tubular insert, the shoulder abutting against the tubular insert;
a flexible tube having an end portion disposed in the annular hose receiving space; and
a fixing bolt including an external surface with an externally threaded portion and an internal bore, the internal bore having a first bore section disposed on the first end of the sleeve and a second bore section that is smaller than the first bore section to form an abutment surface that faces in a first axial direction of the internal bore to abut against the first end of the sleeve, the shoulder being disposed to limit movement of the tubular insert in the first axial direction, with the sleeve being disposed completely on one axial side of the abutment surface of the fixing bolt with respect to a center axis of the fixing bolt, the sleeve, the tubular insert, and the flexible tube being frictionally fixed together to twist as a unit relative to the fixing bolt.

12. The twistable hydraulic hose joint as set forth in claim 11, wherein the sleeve further includes a third passageway section extending from the second passageway section towards the first end of the sleeve, with the third passageway section having a larger diameter than the second diameter of the second passageway section, and the tubular insert is disposed within the third passageway section of the center passageway of the sleeve with the annular hose receiving space formed therebetween such that the flexible tube is disposed in the third passageway section between the tubular insert and the sleeve, and the tubular insert has one end disposed within the second passageway section of the center passageway of the sleeve.

13. The twistable hydraulic hose joint as set forth in claim 12, wherein the third passageway section of the sleeve includes an inner surface having at least one rib.

14. The twistable hydraulic hose joint as set forth in claim 12, wherein the third passageway section of the sleeve includes an inner surface having a plurality of annular ribs.

15. The twistable hydraulic hose joint as set forth in claim 11, wherein the tubular insert includes an outer surface with at least one ridge.

16. The twistable hydraulic hose joint as set forth in claim 11, wherein the tubular insert includes an outer surface with a plurality of ridges.

17. The twistable hydraulic hose joint as set forth in claim 11, wherein the outer surface of the fixing bolt further includes a tool engaging portion that has a larger external width than the externally threaded portion as measured in a direction perpendicular to a center axis of the fixing bolt.

18. The twistable hydraulic hose joint as set forth in claim 11, wherein the sleeve is crimped onto the end portion of the flexible tube such that the sleeve frictionally engages the flexible tube.

19. The twistable hydraulic hose joint as set forth in claim 11, wherein the tubular insert contacts an interior passageway of the end portion of the flexible tube such that the flexible tube is frictionally secured on the tubular insert.

\* \* \* \* \*